Figure 1:
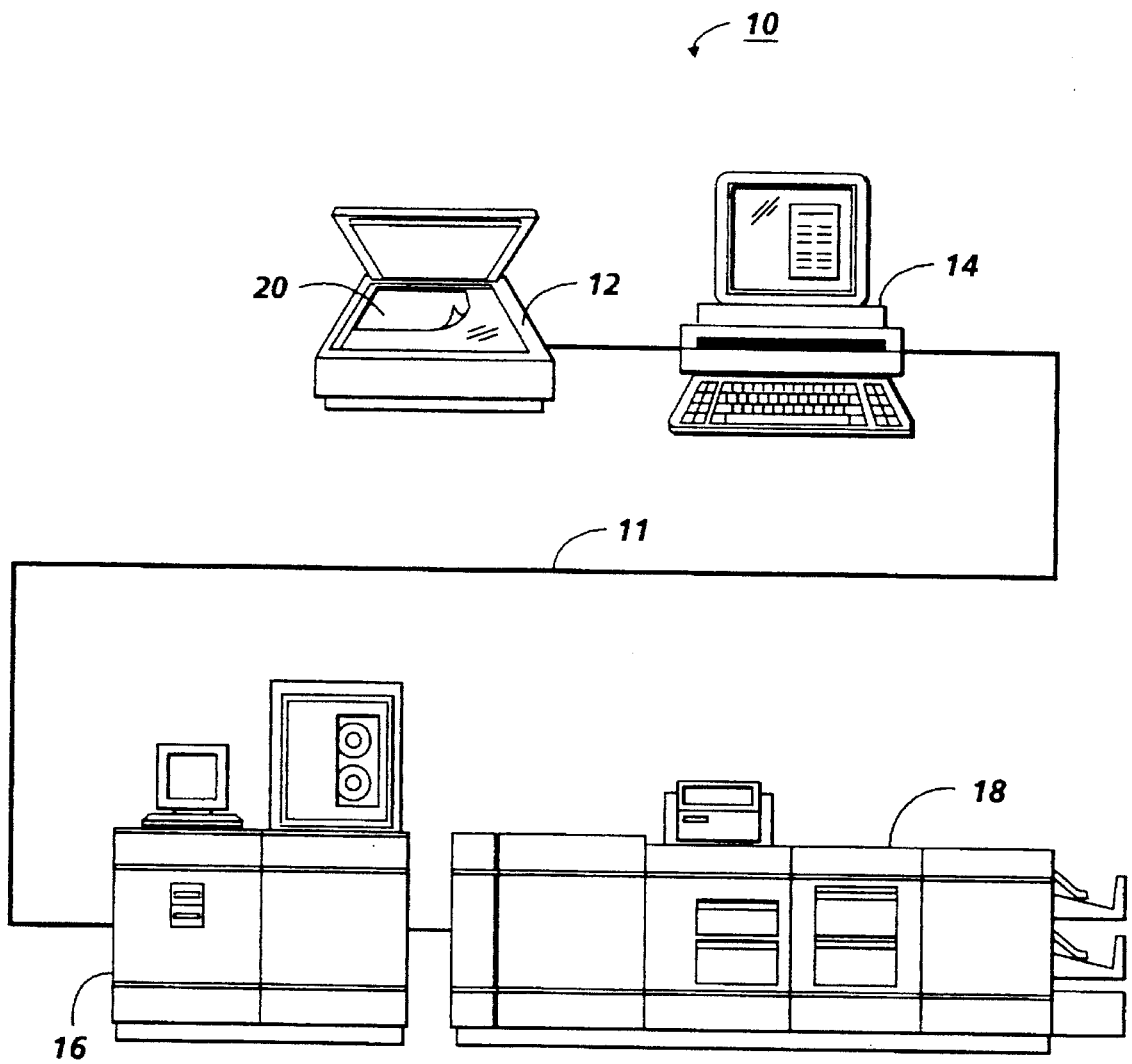

United States Patent [19]

Wagley

[11] Patent Number: 5,568,248

[45] Date of Patent: Oct. 22, 1996

[54] BLACK AND WHITE REPRODUCIBLE PATTERN HIGHLIGHT COLOR PRINTING

[75] Inventor: John S. Wagley, Penfield, N.Y.

[73] Assignee: Xerox Corporation, Stamford, Conn.

[21] Appl. No.: 349,283

[22] Filed: Dec. 5, 1994

[51] Int. Cl.⁶ .................................................. G03G 15/01
[52] U.S. Cl. ............................................................. 355/328
[58] Field of Search .................................. 355/201, 202, 355/239, 328, 210, 326 R, 327

[56] References Cited

U.S. PATENT DOCUMENTS

| | | | |
|---|---|---|---|
| 3,807,852 | 4/1974 | Hoydic | 355/201 X |
| 4,308,553 | 12/1981 | Roetling | 358/75 |
| 4,703,318 | 10/1987 | Haggerly | 346/723 |
| 4,845,524 | 7/1989 | Okamoto et al. | 355/239 |
| 5,098,817 | 3/1992 | Voorhees | 355/328 X |
| 5,138,465 | 8/1992 | Ng et al. | 355/328 X |
| 5,142,337 | 8/1992 | Karidis et al. | 355/239 X |
| 5,153,576 | 10/1992 | Harrington | 340/793 |
| 5,153,739 | 10/1992 | Laman et al. | 355/328 X |
| 5,291,243 | 3/1994 | Heckman et al. | 355/201 |
| 5,321,470 | 6/1994 | Hasuo et al. | 355/201 |

*Primary Examiner*—Robert Beatty

[57] ABSTRACT

In a reproduction method for printing a hardcopy document with a highlight color printer so that the hardcopy document is printed with areas thereof printed with a selected highlight color imaging material and areas thereof printed with a black imaging material, which hardcopy documents may be subsequently optically copied as black and white copies on a black and white only optical reproduction apparatus, selected highlight color imaging materials which do not copy well on the black and white only optical reproduction apparatus are printed with a repeating optically distinguishable pattern in the highlight color printed areas of the hardcopy document with the same highlight color printer concurrently with the printing of the selected highlight color. The pattern is optically distinguishable by the black and white only document reproduction apparatus so as to automatically reproduce in the black and white copies made of the hardcopy document. The optically distinguishable pattern may be printed with black imaging material superposed with the highlight color imaging material.

2 Claims, 2 Drawing Sheets

BLACK AND WHITE REPRODUCIBLE PATTERN HIGHLIGHT COLOR PRINTING

Cross-reference and incorporation by reference is made to a copending commonly assigned application Ser.No. 08/340,942 filed Nov. 17, 1994 by Alan Goldsmith, attorney docket No. D/94108, for its descriptions of highlight color font area printing from black only originals with font recognition.

The disclosed system provides a distinguishable pattern in the highlight color printed areas of a hardcopy document which will reproduce in black and white copies made of the document on a traditional xerographic copier or other black and white only document reproduction apparatus. This disclosed system may be compatibly utilized with various conventional or existing commercial copiers, printers, document scanners, image processors, page description languages and other software.

By way of background, it has become increasing popular to generate hardcopy documents with selected areas and/or selected fonts printed in a highlight color, i.e., a color other than black, so as to provide emphasis or distinction to those areas of the document image. This can now be easily done an various commercial highlight color copiers and printers. However, some of these highlight colors do not reproduce well when the highlighted hardcopy document is copied on a traditional black and white only xerographic copier, especially, pastel colors such as yellow. Thus, the color highlighting area distinctions, and any information it may contain, may be lost on black and white copies and subsequent copies of the document.

It is known that selected background and/or alphanumeric text areas may be printed in repeating and/or varying patterns of highlight color, and/or interposed with a black repeating and/or varying pattern, as disclosed for example for single pass xerographic printing of composite image security documents in Xerox Corporation U.S. Pat. No. 5,291,243 issued Mar. 1, 1994 to Heckman, et al./infra. Some of such color patterns might also reproduce when such documents are copied on a black and white copier. However, that is not the intent, and it is not effective for all colors. Manual highlight coloring with patterns can also be done with patterned inking rollers or colored line printed transparent adhesive labels, etc.

Of further background interest are Xerox Corporation patents U.S. Pat. No. 4,308,553 issued Dec. 29, 1981 to Paul Roetling, "METHOD AND APPARATUS FOR MAKING MONOCHROME FACSIMILES OF COLOR IMAGES ON COLOR DISPLAYS"; and U.S. Pat. No. 5,153,576 issued Oct. 6, 1992 to Steven Harrington, "MAPPING OF COLOR IMAGES TO BLACK-AND-WHITE TEXTURED IMAGES"(Some conventional PDL enabled printer products can now also take color designated objects and print them in B&W.)

Said U.S. Pat. Nos.5,153,576 and 4,308,553, however, operate in a different manner to accomplish a different purpose. They are methods of electronically converting a full color document into a monochrome facsimile for subsequent monochrome printing by electronically converting pixel by pixel the original solid colors into various different patterns of black only images.

In contrast, in the system disclosed in the embodiment herein, there is a common document creation in a digital printing apparatus of both the highlight or other color area of a document and a superposed monochrome reproducible patterning thereof. Both are generated in the developing stage in the same highlight printing (two color) machine. (A full color machine can, of course, also be used as a highlight color printer.) The superposed monochrome or black pattern of the highlighted area(s) is created automatically on reproduction copy documents by the xerographic or other copying of the highlighted color and superposed monochrome pattern image with or on a monochrome (black only) reproduction machine. No special operator involvement or electronic reading or image manipulation is required. Furthermore, the highlight color need not be created pixel by pixel but may be uniformly applied over the entire highlighted portion of the document, as in analog highlight color systems. The superposed pattern may also be a logo or other words or pictures creating a special effect and consumer appeal.

In the disclosed embodiment, a black i image pattern may be printed onto the copy sheet or other image substrate first, and a color highlight image or pattern layer developed and printed thereover, on top of the black image. Because a xerographic or other color toner layer r is not usually fully opaque, especially for colors which do not copy well on a monochrome (black only) copier, even if the color highlighting is a solid area coverage printed over the entire black image, the black image will "show through" or image when the entire superposed image on the image substrate is copied on a monochrome or black and white copier (or a four color copier operating in a black only print mode). Thus, the black image will print even in the fully superposed highlight color image areas even if the highlight color itself will not reproduce on the monochrome reproduction apparatus.

Of particular background interest as to digital color printing of variable image background patterns of intermixed dots or areas, using a tri-level xerographic printer, or color ink jet printer, or other known highlight color digital printer, is said Xerox Corporation U.S. Pat. No. 5,291,243 to Heckman, et al, supra, and other art noted therein. Said U.S. Pat. No. 5,291,243 notes that a highlight color printer and its imaging controls that can provide "perfect registration" is the Xerox Corporation "4850" (or 4890) "Highlight Color Laser Printing System" product. It has single-pass two color "perfect registration", with the ability to print an integral image of interdigitated pixels of the two colors. That printer has a tri-level xerographic system, as further explained, inter alia, in Xerox Corporation U.S. Pat. Nos. 5,144,369; 4,811,046; and 4,847,655; and additionally in U.S. Pat. Nos. 5,157,441; 5,138,378; 5,119,131; and 5,132,730. Particularly noted re providing interdigitated color pixels of alternating colors and varying white or unprinted spaces (difficult to produce on other copiers or printers) is Xerox Corporation U.S. Pat. No. 4,903,048, issued Feb. 20, 1990 to S. J. Harrington. However, said U.S. Pat. No. 5,291,243 also notes that other electronic printers and/or image generation and/or transfer devices and/or marking materials may be alternatively utilizable if they can provide comparable printing requirements. For example, a two-color, single-head, ink jet printing head is disclosed in Xerox Corporation U.S. Pat. Nos. 4,620,198 and 4,899,181.

Said U.S. Pat. No. 5,291,243 further notes by way of background, that known electronic printing standards includes a specific set of instructions for printing, in a standard for representing documents digitally. The "Interpress™" standard for representing printed pages, for example, is already supported by a wide range of Xerox Corporation and other products. The print service understands and processes "Interpress™" or other PDL instructions received from a workstation, transforming them into a format understood by the printer. The "Interpress™" standard is comprehensive; it can represent any images that can be applied to paper (including complex graphics) and a wide variety of font styles and characters. This allows a user to easily produce new masters and allows the printer to selectively print pages from any master it receives. The "Interpress™" master is also accompanied by properties and options which specify document name, color, and creation date. The print service interprets the master and then directs the printer during the printing process. Workstations on the network can interact with the print service. This software runs automatically when users request that a document be printed. It converts the document format used by the workstation into an "Interpress™" master which is transmitted to the print service. Utilizing an inter-network routing service, users can transmit "Interpress™" or other printing masters through a network and then across an internet.

Said U.S. Pat. No. 5,291,243 further notes that an image generation system can be provided by using a personal computer, with available software. For example, an IBM PC AT or the like, having a mouse and a color VGA monitor and operating CorelDRAW Version 3.0 graphics design software, Corel Corporation, 1992, and Elixir forms-creation software, a description of which is found in the Xerox Printing Productivity Series: Elixir Edition for Highlight Color, User Guide for ElixiForm/ElixiSys Version 2.10; ElixiGraphics Version 2.10a; and ElixiFont Version 1.0 publication numbers 720P60700, 720P60691 and 720P82890, by Xerox Corporation, dated August 1991, March 1992 and June 1989, respectively. Elixir is an interactive software design tool that enable a user to create forms, custom fonts and the like for use with a highlight color printer. Forms include elements such as lines, boxes, text and images, all of which can have highlight color attributes. The static data can subsequently be merged with variable data for printing on color-compatible printers using a known Forms Source Language (FSL).

Also noted regarding commercially available software for color designation or representation of document areas is the well known "Postscript II" product.

A specific feature of the specific embodiments disclosed herein is to provide a reproduction method for printing a hardcopy document with a highlight color printer so that the hardcopy document is printed with areas thereof printed with a selected highlight color imaging material and areas thereof printed with a black imaging material, which hardcopy documents may be subsequently optically copied as black and white copies on a black and white only optical reproduction apparatus, the improvement for selected highlight color imaging materials which do not copy well on said black and white only optical reproduction apparatus, comprising printing an optically distinguishable pattern in said highlight color printed areas of said hardcopy document with said same highlight color printer concurrently with said printing of said selected highlight color imaging material in said highlight color printed areas, said optically distinguishable pattern being optically distinguishable by said black and white only document reproduction apparatus so as to automatically reproduce in said black and white copies made of said hardcopy document on said black and white only optical reproduction apparatus.

Further specific features provided by the system disclosed herein, individually or in combination, include those wherein said optically distinguishable pattern is printed with said black imaging material superposed with said highlight color imaging material; and/or wherein said optically distinguishable pattern is a repeating pattern automatically printed with said black imaging material superposed with said highlight color imaging material by developing both on a photoreceptor surface and transferring both to an image substrate to form said hardcopy document; and/or wherein said optically distinguishable pattern is electronically generated; and/or wherein said optically distinguishable pattern is a repeating pattern automatically printed with said highlight color imaging material, and said black imaging material is underlying said highlight color imaging material on said hardcopy document but is optically reproducible therethrough by said black and white only optical reproduction apparatus; and/or a printing machine of the type having a developer unit adapted to develop with marking particles a latent image recorded on an image receiving member, the machine comprising means for generating a first image to be processed; means for generating a second image on said first image, said second image having a pattern superimposed therein, and means for developing with marking particles said first and second image; and/or wherein said first image comprises a black image; and/or wherein said second image comprises a color image; and/or wherein said pattern comprises a repeating pattern; and/ or wherein said pattern comprises a pattern of repeating text; and/or wherein said superimposed pattern comprises an electronically generated superimposed pattern; and/or wherein said superimposed pattern comprises an mechanically generated superimposed pattern; and/or a method for developing with marking particles a latent image recorded on an image receiving member, the method comprising the steps of generating a first image; generating a second image; superimposing a pattern on said second image; developing said first image; and developing said second image; and/or wherein the step of generating the first image comprises the step of generating a black image; and/or wherein the step of generating the second image comprises the step of generating a color image; and/or wherein the step of superimposing a pattern on said second image comprises the step of superimposing a repeating pattern on said second image; and/or wherein the step of superimposing a pattern on said second image comprises the step of superimposing a pattern of repeating text on said second image.

It is well known and commonplace to program and execute imaging, printing, document, and/or paper handling control functions and logic with software instructions for conventional or general purpose microprocessors. This is taught by various prior patents and commercial products. Such programing or software may of course vary depending on the particular functions, software type, and microprocessor or other computer system utilized, but will be available to, or readily programmable without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI designs.

In the description herein the term "sheet" refers to a usually flimsy physical sheet of paper, plastic, or other suitable physical substrate for images, whether precut or web fed. A "copy sheet" may be abbreviated as a "copy ", or called "hardcopy". A "job" is normally a set of related sheets, usually a collated copy set copied from a set of original document sheets or electronic document page images, from a particular user, or otherwise related.

As to specific hardware components of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Figure 2:
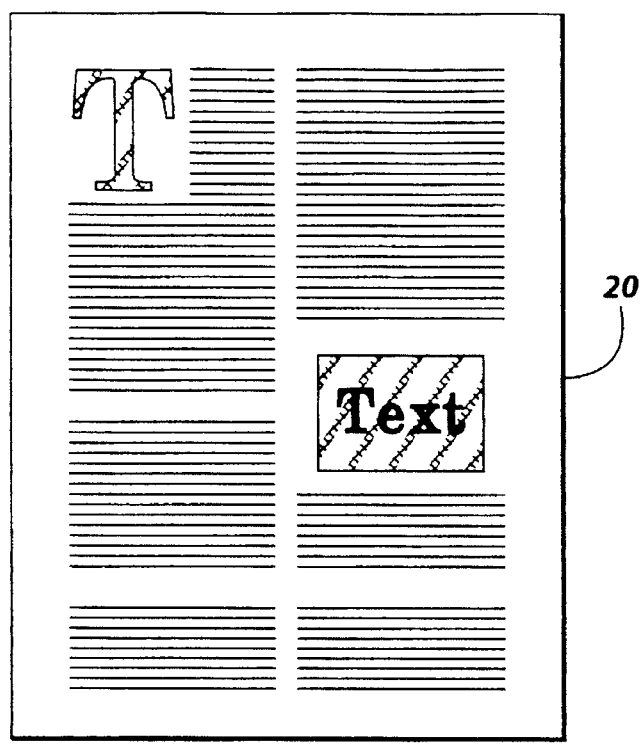
Figure 3:
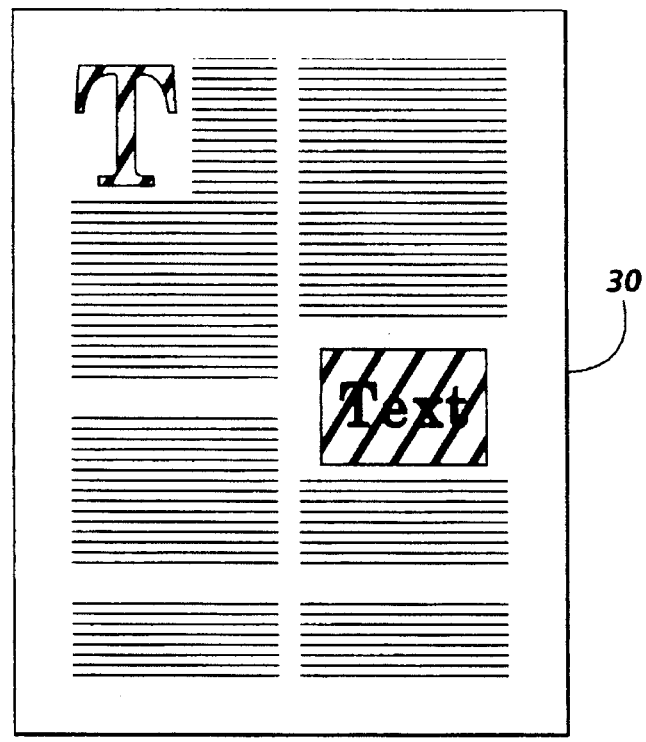

FIG. 1 schematically illustrates one example of the present system with a highlight color printer operated or modified as described which is networked to a conventional PC operator graphic user interface or terminal operating with suitable PDL image processing software, and a connecting network server;

FIG. 2 shows one example of a hardcopy document, produced by the highlight color printer of FIG. 1, with an exemplary highlight color printed area with a superposed black and white copier reproducible image pattern; and FIG. 3 shows a black and white copier reproduction copy of the document of FIG. 2.

Referring to the Figures, there is shown in FIG. 1, merely by way of examples with which the present reproduction system or method 10 may be used with, or incorporated into, a document processing network 11, in which are illustrated here a physical document scanner 12, operator terminal with keyboard (user interface) 14, server 16 and highlight (or full) color printer 18 for printing the exemplary document 20 of FIG. 2, or other document. An exemplary conventional optical back and white copier on which the exemplary hardcopy document 20 of FIG. 2 may be optically copied to produce its black and white copy 30 of FIG. 3 could be or look like 18 also.

Since the document 20 generation and patterning described and illustrated here can be done with well known pattern generation and storage and area control and merge functions in software and patents cited above, or other software, on conventional hardware, it need not be described in detail. Alternatively, a known movable optical screen screening of a highlight image being projected onto a photoreceptor could be used. However, known electronic screening is now preferable.

The highlighted color image and/or superimposed black image can have any desired pattern, such as diamond, dot, crosshatched, or spaced lines patterns. The pattern could be superimposed over text or shading (foreground or background). The pattern could likewise be a repeated trademark or customers logo. For a laser printer or other reproduction machine with digital color, a digital electronic pattern may be combined with highlight area X-Y "on" data to provide a pattern data in an area to produce image data in the laser printer controller. This can all be provided electronically. The only other hardware would be a pattern generation on/off switch or user interface screen selection thereof. As indicated, alternatively, for a machine with analog color, a physical screen containing the desired pattern could be placed between the photoreceptor and the lens. A patterned developed image would thus be developed on the photoreceptor. In such a system two development passes may be required.

It will be appreciated that typical system networks may include choices of several such or different electronically accessible components. Although digital network systems are typically in some sort of electronic communications or connection, it will be appreciated that the present system may also be used with electronic documents transferred between equipment by floppy or hard disks, or other manually transported media.

The disclosed system may be used for document images generated by scanning in, on an optical scanner, existing hardcopy (physical sheet or book) documents, or fully electronically generated, as described above by reference to know techniques and software. The highlight color printer 18 can be programmed to reproduce the document images with highlight coloring of a selected font or fonts, and/or selected areas.

A black repeating image pattern may be printed onto the copy sheet or other image substrate first, and a color highlight image or pattern layer developed and printed thereover, on top of the black image, by sequential printing. Alternatively, both toner images may be developed first on the photoreceptor surface or other intermediate with the black image on top of the colored image, and then transferred simultaneously to the copy sheet, so that the black image ends up on the bottom. Because a xerographic or other color toner layer is not usually fully opaque, especially for colors which do not copy well on a monochrome (black only) copier, even if the color highlighting is a solid area coverage printed over the entire black image, the black image will "show through" or image when the entire superposed image on the image substrate is copied on a monochrome or black and white copier. Thus, the black image will print even in the fully superposed highlight color image areas even if the highlight color itself will not reproduce on the monochrome reproduction apparatus. (A black and white copier may be a four color copier operating in a black only print mode.)

The operator may select certain fonts to be printed in color. This may be done by variably operator pre-programming (and storing) programmable software controls to recognize one or more particular fonts. The operator may either enter the font description directly, if known, or, more likely, select with a mouse or other cursor device a text string, segment or part of a displayed specific single font text on the terminal 14 display screen (user interface), which particular font text is part of the displayed imaged of the document. These will often be special print, large area, fonts, as typically used in titles, subtitles, etc., since that is often the part of documents operators-wish to highlight and stand out from the rest of the document text. However, the present system is not limited thereto.

Thereafter, until deselected or changed by the operator to different fonts, upon such recognition, the software will automatically generate color printing instructions associated with those recognized fonts, so that they will automatically print in color (on a color printer) separately from the rest of the document. That is, the selected fonts, and only the selected fonts, may be printed in color, to stand out, while the rest of the document, that is, all of it printed in other fonts, may still be printed in its original black and white. This may be provided with color printing software conventional for various printers with color printing capability. E.g., using a color font description or a "Postscript II" or other color object description such as "print this object red". Commercially available PDL software products enable an electronic document to have a "font call" in electronic code electronically identifying a particular text to be printed in a particular font.

Also, for selecting a highlight color area, it is well know to do so on a color copier "copy board" by manually defining, on selected x and y axes, with an axis locator pen or the like, each area of the document to be highlight colored, as in many present highlight color reproduction systems. Any part of the document in the selected area will be automatically printed in color.

It will also be appreciated that electronic documents electronically prepared in black and white only PDLs not having color descriptive capability may also be selective font color printed. In that case, the B&W PDL font descriptor(s) of the fonts desired to be highlight color printed can be programmed in to be recognized and a color print descriptor added to that font descriptor, in the user interface terminal, server, printer controller, or other image processor in the network. That may include freshly typed text to be merged into scanned-in hardcopy documents as well as separate non-hardcopy originals. As noted, commercially available PDL software products provide a "font call" in electronic code electronically identifying a particular text to be printed in a particular font. This font call can be additionally provided with a color selection here.

A patterned color is envisioned, so that when the colored (highlighted) copy is reproduced in black the highlighted areas would be distinguishable from the black printed areas, whether the highlighted area is highlighted text or highlighted background pattern over black text. However, an alternative is for the black area to be patterned and the superposed highlighted area printed in a solid or uniform density color so that when copied the black and highlighted areas would still be distinguishable.

While the embodiment disclosed herein is preferred, it will be appreciated from this teaching that various alternatives, modifications, variations or improvements therein may be made by those skilled in the art, which are intended to be encompassed by the following claims:

What is claimed is:

1. A reproduction method comprising printing a physical original document sheet with at least one highlight color area in a highlight color document printer, which highlight color area is a uniformly applied print color area of a color which does not copy well when said document sheet with said highlight color area is copied on a conventional black only reproduction apparatus, and also concurrently printing a black print show-through print repeating pattern superposed under said highlight print color area on said same original document sheet, which black show-through print repeating pattern is highly visible to and reproducible by said conventional black only reproduction apparatus and is not a half-tone pattern, and then copying said original document sheet on a black only reproduction apparatus to generate black print copies in which said highlight color area of said original document sheet contains on said black print copies thereof said highly visible distinguishable black print repeating pattern over said highlight color area which is visually indicative of the original color highlighting of said area.

2. The reproduction method of claim 1 wherein highly visible distinguishable black print repeating pattern comprises a pattern of repeating text.

* * * * *